US008844150B2

(12) United States Patent
Verdi et al.

(10) Patent No.: US 8,844,150 B2
(45) Date of Patent: Sep. 30, 2014

(54) MEASURING MACHINE PROVIDED WITH A BLOCK OF CONCRETE HAVING THE FUNCTION OF FOUNDATION OR MACHINE BED, AND METHOD FOR COMPENSATING THE MEASURING ERRORS DUE TO DEFORMATIONS OF THE BLOCK

(75) Inventors: Michele Verdi, Rivoli (IT); Lorenzo Merlo, Turin (IT); Alberto Tarizzo, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 232 days.

(21) Appl. No.: 13/571,171

(22) Filed: Aug. 9, 2012

(65) Prior Publication Data

US 2013/0205607 A1 Aug. 15, 2013

(30) Foreign Application Priority Data

Aug. 12, 2011 (EP) .................................... 11177514

(51) Int. Cl.
*G01B 5/008* (2006.01)
*G01B 5/00* (2006.01)
*G01B 21/04* (2006.01)

(52) U.S. Cl.
CPC .............. *G01B 5/008* (2013.01); *G01B 5/0016* (2013.01); *G01B 21/045* (2013.01)
USPC ............................................. 33/503; 33/702

(58) Field of Classification Search
USPC ................................................... 33/503, 702
See application file for complete search history.

(56) References Cited

U.S. PATENT DOCUMENTS

| 4,730,497 | A | * | 3/1988 | Rabensteiner et al. | ......... 73/803 |
|---|---|---|---|---|---|
| 5,119,566 | A | | 6/1992 | Schalz et al. | |
| 5,778,549 | A | | 7/1998 | Campanile | |
| 7,266,903 | B2 | * | 9/2007 | Sato | ............................... 33/702 |
| 8,537,372 | B2 | * | 9/2013 | Pettersson et al. | ............. 33/503 |
| 8,607,466 | B2 | * | 12/2013 | Pettersson et al. | ............. 33/503 |
| 8,667,698 | B2 | * | 3/2014 | Verdi et al. | ...................... 33/503 |
| 2010/0024206 | A1 | * | 2/2010 | Mizuta et al. | .................... 33/534 |
| 2011/0296701 | A1 | * | 12/2011 | Tarizzo | ........................... 33/503 |
| 2012/0000083 | A1 | * | 1/2012 | Tarizzo | ........................... 33/503 |
| 2012/0167402 | A1 | * | 7/2012 | Verdi et al. | ...................... 33/503 |
| 2013/0167389 | A1 | * | 7/2013 | Christoph et al. | ............. 33/503 |
| 2013/0227850 | A1 | * | 9/2013 | Singh et al. | ..................... 33/503 |

FOREIGN PATENT DOCUMENTS

EP 1 559 990 A2 8/2005

OTHER PUBLICATIONS

European Search Report dated Dec. 19, 2011 as received in application No. 11 17 7514.4.

* cited by examiner

*Primary Examiner* — G. Bradley Bennett
(74) *Attorney, Agent, or Firm* — Maschoff Brennan

(57) ABSTRACT

A co-ordinate measuring machine comprising a block of concrete with function of foundation or machine bed, and a plurality of linear deformation sensors embedded in the block or applied thereto and configured for detecting the deformations of the block itself for compensating the measuring errors of the machine resulting from said deformations.

14 Claims, 7 Drawing Sheets

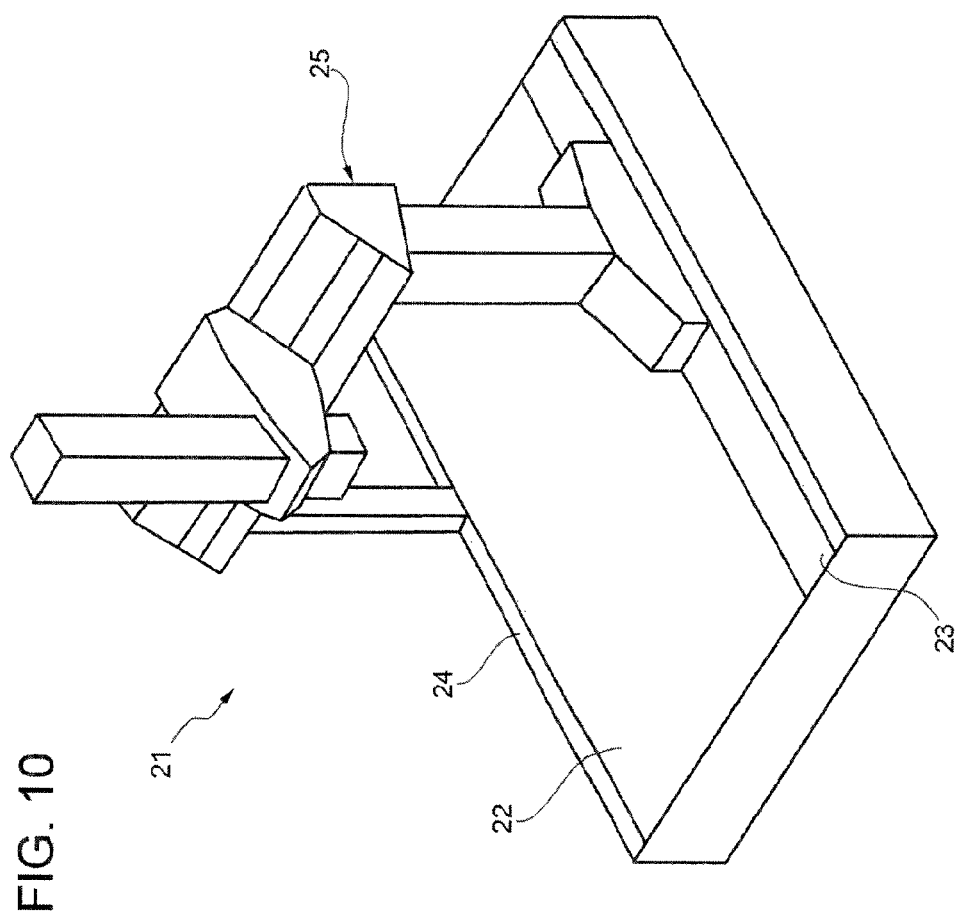

MEASURING MACHINE PROVIDED WITH A BLOCK OF CONCRETE HAVING THE FUNCTION OF FOUNDATION OR MACHINE BED, AND METHOD FOR COMPENSATING THE MEASURING ERRORS DUE TO DEFORMATIONS OF THE BLOCK

FIELD OF THE INVENTION

The present invention relates to a measuring machine provided with a block of concrete having the function of foundation or machine bed, and to a method for compensating the measuring errors due to deformations of said block.

BACKGROUND OF THE INVENTION

Co-ordinate measuring machines in some cases comprise as foundation a block of concrete. This occurs in particular in the case of machines of large dimensions, such as for example gantry machines, where the columns are constrained to the foundation bed, or else horizontal-arm machines (the latter frequently provided with two arms co-operating with one another), where the machine bed/beds, on which there slides/slide the carriage/carriages that carries/carry the measuring arm/arms, is/are constrained to the foundation bed in a statically determinate or statically indeterminate way.

On account of its low cost and ease of production, the use of the concrete has been recently proposed also in measuring machines of smaller dimensions, for example bridge machines, instead of the traditional machine beds made of granite or cast iron.

SUMMARY OF THE INVENTION

The aim of the present invention is to provide a measuring machine provided with a block of concrete having the function of foundation or machine bed, where the dimensional and/or geometrical variations of the block as a result both of the load (weight of the piece and of the mobile parts of the machine supported by the machine bed) and the dimensional instability of the material over time are detected in order to compensate for the errors that derive therefrom.

The aforesaid aim is achieved by a measuring machine according to claim 1 and by a method according to claim 12.

BRIEF DESCRIPTION OF THE DRAWINGS

For a better understanding of the present invention, some preferred embodiments are described in what follows, by way of non-limiting examples and with reference to the attached drawings, wherein:

FIG. 10 illustrates a bridge measuring machine, according to a further embodiment of the present invention.

DETAILED DESCRIPTION OF THE INVENTION

Figure 1:
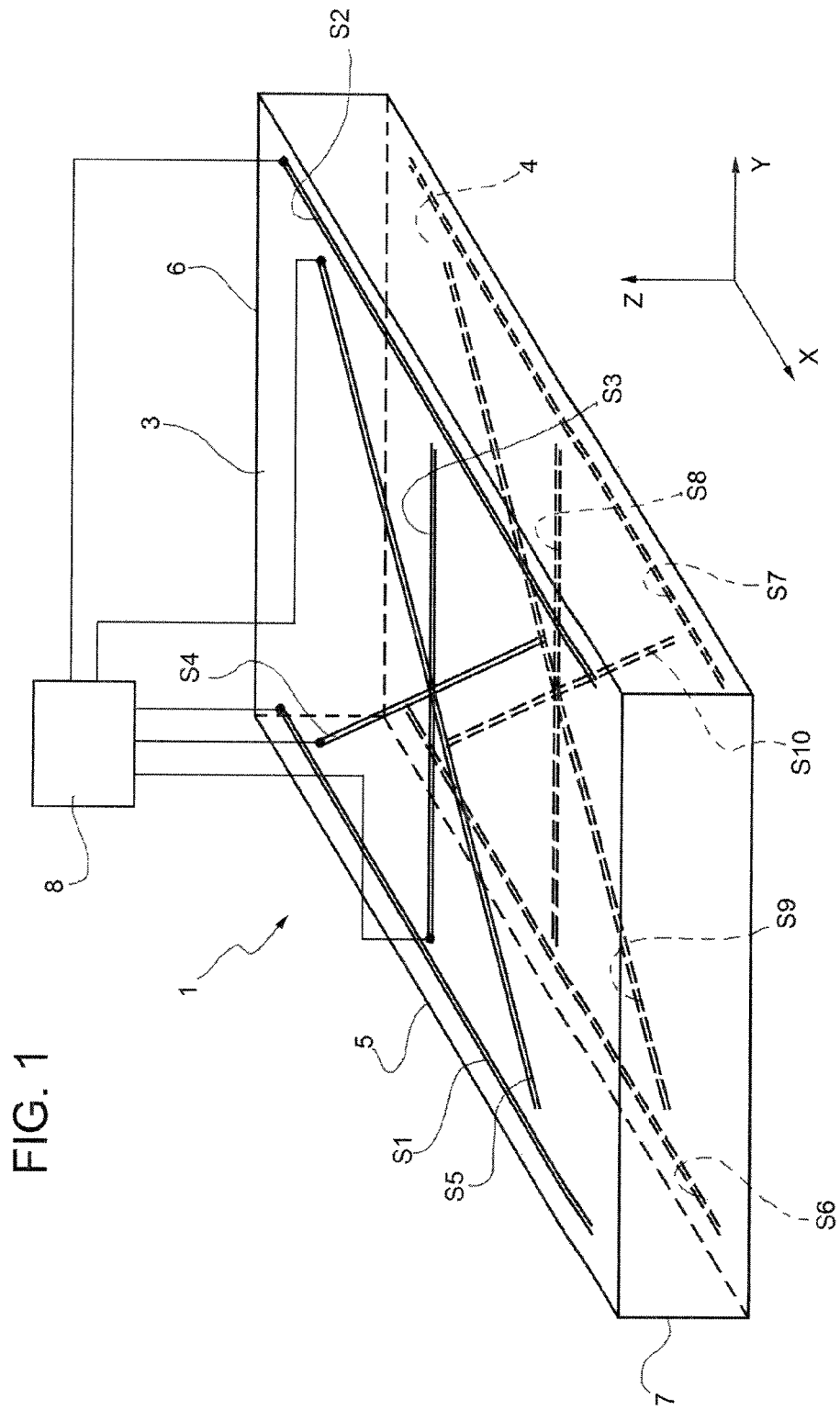
FIG. 1 is a schematic illustration of a foundation block of a measuring machine obtained according to the present invention.

With reference to FIG. 1, designated as a whole by 1 is a foundation block for a measuring machine.

The block 1 is made of concrete and has a parallelepipedal shape with a top face 3, which can function as measuring surface for positioning the piece to be measured, and a bottom face 4. The faces 3 and 4, which are rectangular in shape, have major sides 5 and minor sides 6; the block 1 has a thickness or depth 7 of considerably smaller than the sides 5 and 6.

A cartesian reference system having the axes X, Y, Z, parallel respectively to the major sides 5, the minor sides 6, and the thickness or depth 7 of the block 1, can be associated to the block 1.

According to the present invention, the block 1 is provided with a plurality of linear deformation sensors S1, ..., S10 embedded in the material constituting the block itself or applied to its faces.

The term "linear sensors" is here used for identifying sensors that extend along a measuring line and are configured for detecting the differences of length induced by the deformations along said line.

The sensors consequently basically detect the mean deformation of the material along the measuring line. The sensors S1, ..., S10 are conveniently made of an optical-fibre interferometric type. For example, the sensors marketed by SMARTEC SA (Switzerland) under the trade name SOFO can be used. Said sensors, which present a substantially elongated tubular shape, exploit the principle of detection of the distance between their own ends through the unbalancing between the path of a measuring fibre and the path of a reference fibre.

The sensors S1, ..., S10 are connected to a read unit 8, which receives and processes the signals thereof, and dialogues with a control unit (not illustrated) of the measuring machine so as to supply thereto signals that are correlated with the deformations of the block 1 and that, in a conventional way, can be used for compensation of the geometrical errors of the machine.

The number and position of the sensors can vary according to the deformations that are to be detected.

In the example illustrated ten sensors are used, five of which (S1, ..., S5) are embedded in the proximity of the top face 3 or applied thereto, and five (S6, ..., S10) are embedded in the proximity of the bottom face 4 or applied thereto.

The sensors S1 and S2 are arranged along the major sides 5 of the top face 3, in a direction parallel to the axis X. The sensor S3 is set transversely with respect to the top face 3, in a direction parallel to the axis Y, for example in the proximity of the centre line, as illustrated in FIG. 1, or else along one of the minor sides 6. The sensors S4 and S5 are arranged crosswise with respect to one another and inclined at 45° with respect to the sides 5, 6 of the top face 3.

Likewise, the sensors S6 and S7 are arranged along the major sides 5 of the bottom face 4 in a direction parallel to the axis X. The sensor S8 is set transversely with respect to the bottom face 4 in a direction parallel to the axis Y. The sensors S9 and S10 are arranged crosswise with respect to one another and inclined at 45° with respect to the sides 5, 6 of the bottom face 4.

This configuration is suited to a block having a square or quasi-square shape, where, that is, the major and minor sides of the main faces have lengths of the same order, and where it is assumed that the state of deformation can be considered uniform along each of the axes.

In the case where the block presents a markedly elongated shape, or it is desired to take into account variations of the deformations along each of the axes, it is necessary to use a larger number of sensors (for example, two or more sensors in the direction of the length and/or a number of pairs of sensors set crosswise with respect to one another). For example, it is possible to use two or more modules of ten sensors of the type described.

Figure 2:
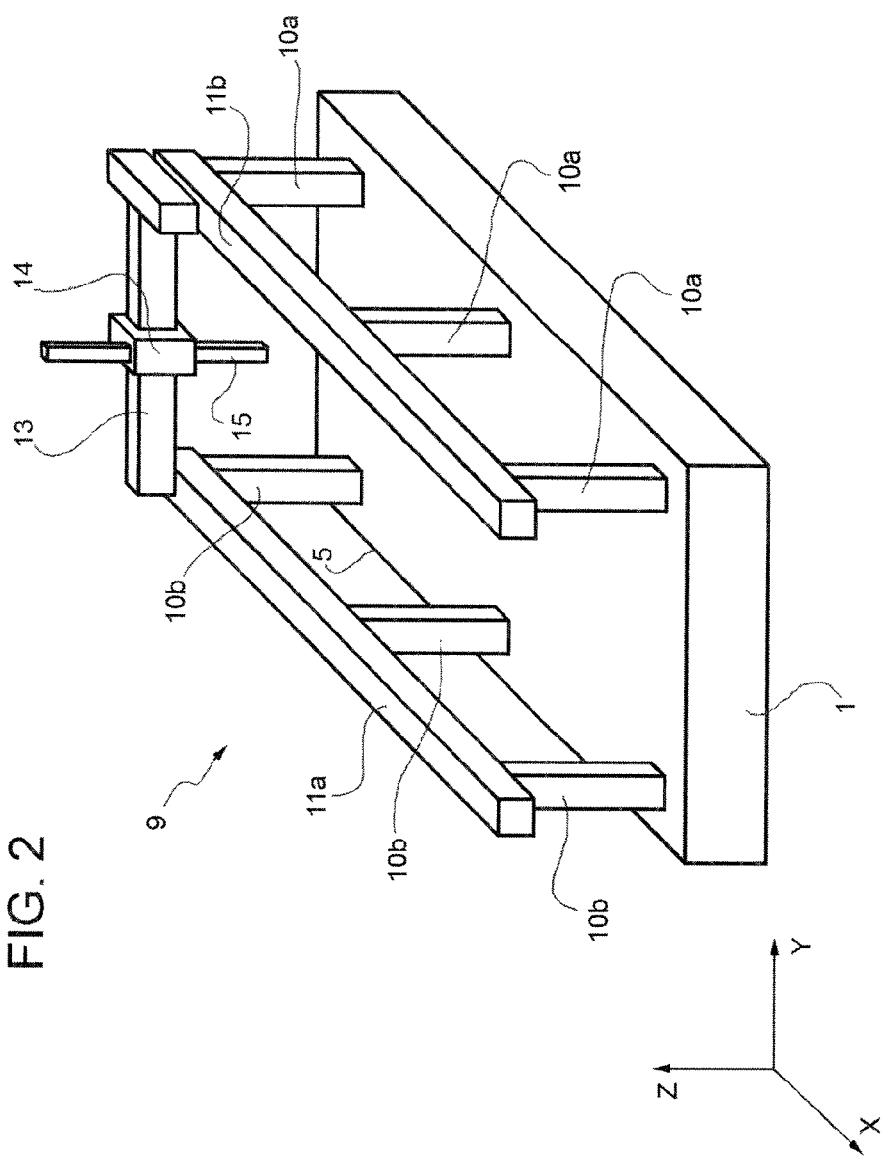
FIG. 2 is a schematic illustration of a gantry measuring machine, which uses the foundation block of FIG. 1.
Figure 3:
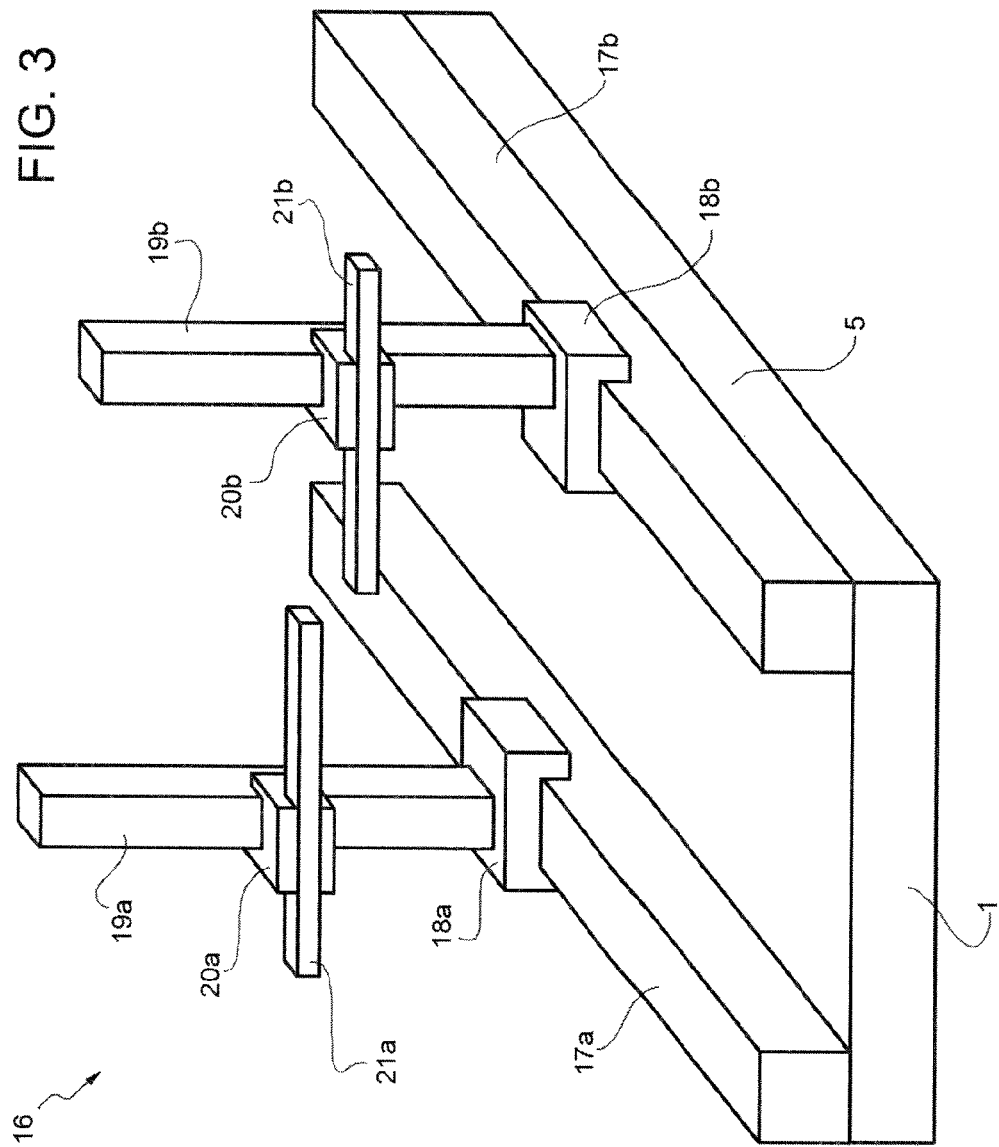
FIG. 3 illustrates an example of embodiment of a dual horizontal-arm measuring machine, which uses the foundation block of FIG. 1.

Illustrated in FIGS. 2 and 3 are two examples of embodiment of co-ordinate measuring machines, which use a foundation block 1 of the type described.

Illustrated in FIG. 2 is a machine 9 of the gantry type, provided with two rows of columns 10a, 10b constrained to the foundation block 1 along each of the major sides 5. The columns support respective beams 11a, 11b provided with guides (not illustrated) parallel to the axis X, along which respective ends of a cross member 13 extending in a direction parallel to the axis Y slide. Slidable in a direction parallel to the axis Y on the cross member 13 is a carriage 14, which in turn carries a measuring column 15 mobile in a direction parallel to the axis Z and designed to be equipped with a measuring sensor (not illustrated).

Illustrated in FIG. 3 is a machine 16 of the dual horizontal-arm type, provided with two machine beds 17a, 17b extending along the major sides 5 of the foundation block 1 and constrained thereto in a statically determinate or statically indeterminate way. Each of the machine beds 17a, 17b is provided with guides (not illustrated) for the sliding, in a direction parallel to the axis X, of respective carriages 18a, 18b provided with respective vertical uprights 19a, 19b. Sliding in a vertical direction (Z) on the uprights 19a, 19b are respective carriages 20a, 20b, which carry respective measuring arms 21a, 21b extending in a direction parallel to the axis Y and slidable along said axis.

Examined in what follows are some modes of deformation typical of the block 1, and for each of them it is indicated how to use the sensors for detection of the deformations.

1.—Longitudinal Bending (in the Plane XZ)

Figure 4:
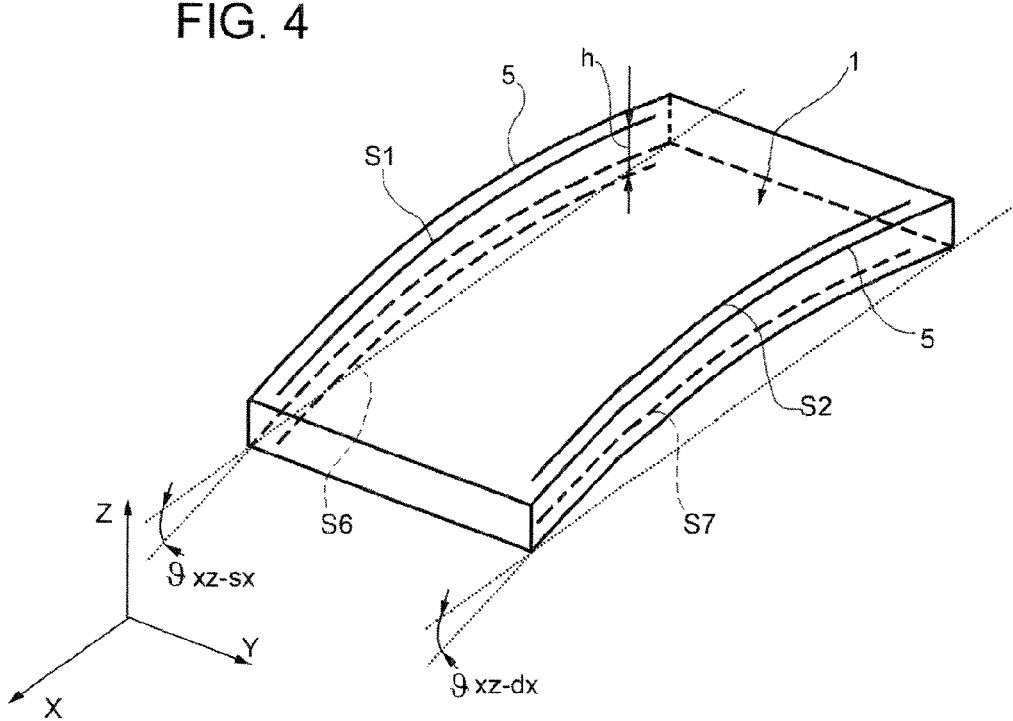
FIGS. 4, 5, 6, 7, and 8 illustrate respective modes of deformation of the block of FIG. 1.

In order to detect bending in the longitudinal plane XZ (FIG. 4), the sensors S1, S2; S6, S7 located in the proximity of the long sides 5 of the block 1 are used.

Detection is conveniently made on two sides along which the guides for the mobile unit of the machine (not illustrated) are set.

If $\Delta l_1$, $\Delta l_2$, $\Delta l_6$, $\Delta l_7$ are the variations in length measured by the corresponding sensors, the longitudinal angles of curvature $\theta_{XY\text{-}sx}$ and $\theta_{XY\text{-}dx}$ of the left and right edges of the block can be calculated applying the following equations:

$$\theta_{XY\text{-}sx}=\arctan\left[(\Delta l_1-\Delta l_6)/h\right] \quad [1]$$

$$\theta_{XY\text{-}dx}=\arctan\left[(\Delta l_2-\Delta l_7)/h\right] \quad [2]$$

where h is the vertical distance between the sensors of each pair S1, S6 and S2, S7.

In gantry machines, this detection can be used for making compensations of roll, pitch, and rectilinearity in the plane XZ.

In dual-arm machines constrained to the base in a statically determinate way enables angle compensation between the two arms about the axis X, it being possible to derive said angle from particular dispositions of the points of rest (it being possible for said angle to be compensated by means of procedures of realignment of the triads).

2.—Transverse Bending (in the Plane YZ)

Figure 5:
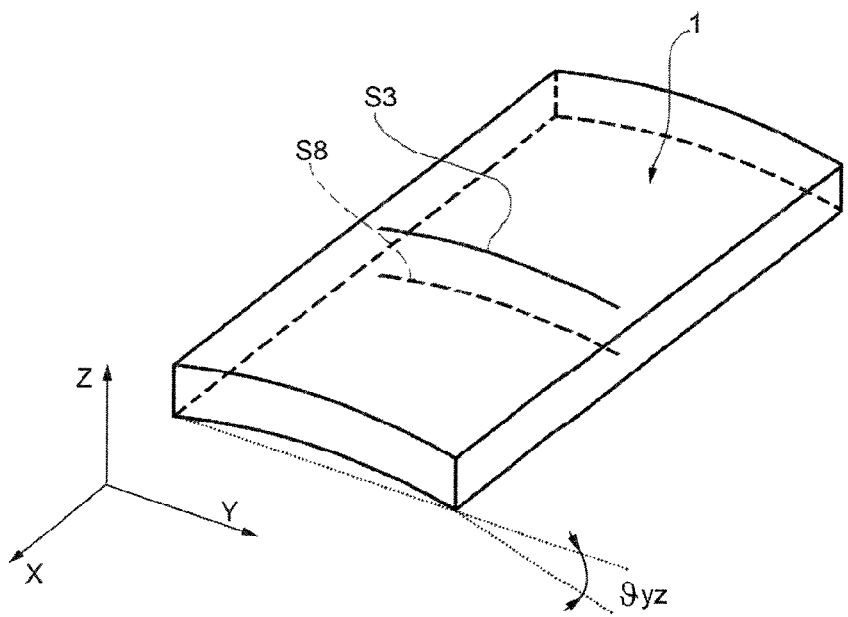

In order to detect bending in the transverse plane YZ (FIG. 5), the sensors S3 and S8 are used. Optionally, instead of a single pair of sensors in the median position, two pairs of sensors could be used set along respective minor sides of the block 1.

If $\Delta l_3$, $\Delta l_8$ are the variations of length measured by the corresponding sensors, the transverse angle of curvature $\theta_{YZ}$ of the block can be calculated applying the equation $$\theta_{YZ}=\arctan\left[(\Delta l_3-\Delta l_8)/h\right] \quad [3]$$

This measurement can be used in the dual horizontal-arm machines for compensating the angular errors between the arms about the axis X (which can be recovered by means of procedures of realignment of the triads).

3.—Bending in the Plane of the Block (Plane XY)

Figure 6:
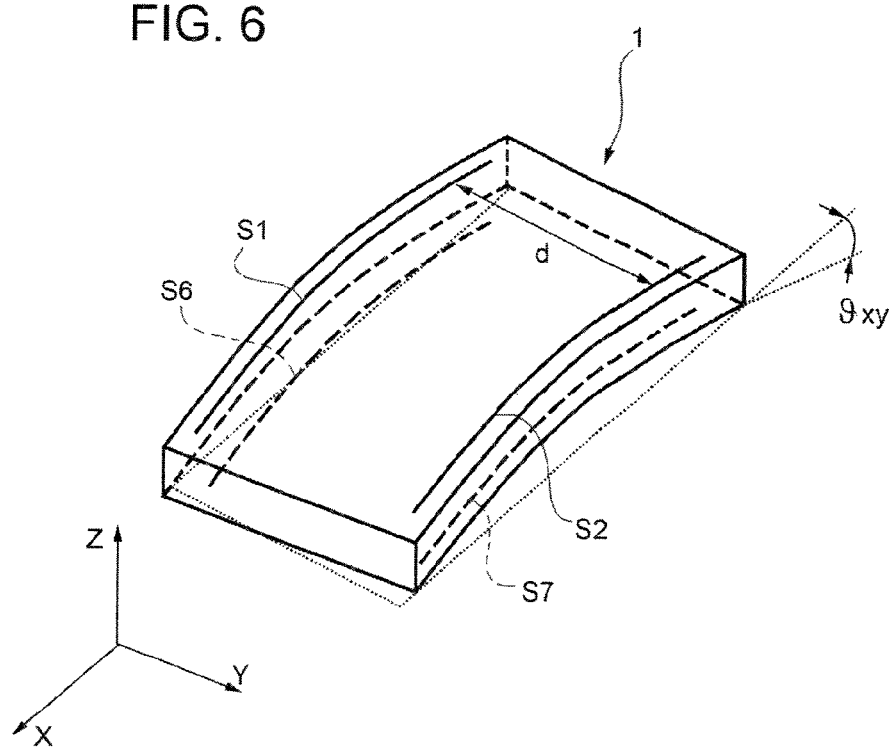

Bending in the mean plane of the block parallel to the plane XY is detected using once again the sensors S1, S2; S6, S7. The angle of bending $\theta_{XY}$ (FIG. 6) can be calculated by applying the following equation:

$$\theta_{XY}=\arctan\left[(\Delta l_1-\Delta l_2)/d\right]=\arctan\left[(\Delta l_6-\Delta l_7)/d\right] \quad [4]$$

where d is the transverse distance between the sensors of each pair S1, S2 and S6, S7.

This measurement can be used for compensating the errors of rectilinearity of the guide in the plane XY and of yaw both in machines of a gantry type and in horizontal-arm machines with machine beds supported in a statically indeterminate way (where, that is, the deformations of the machine bed in the plane XY can induce warpage in the structure of the machine beds).

4.—Torsion about the Axis X

Figure 7:
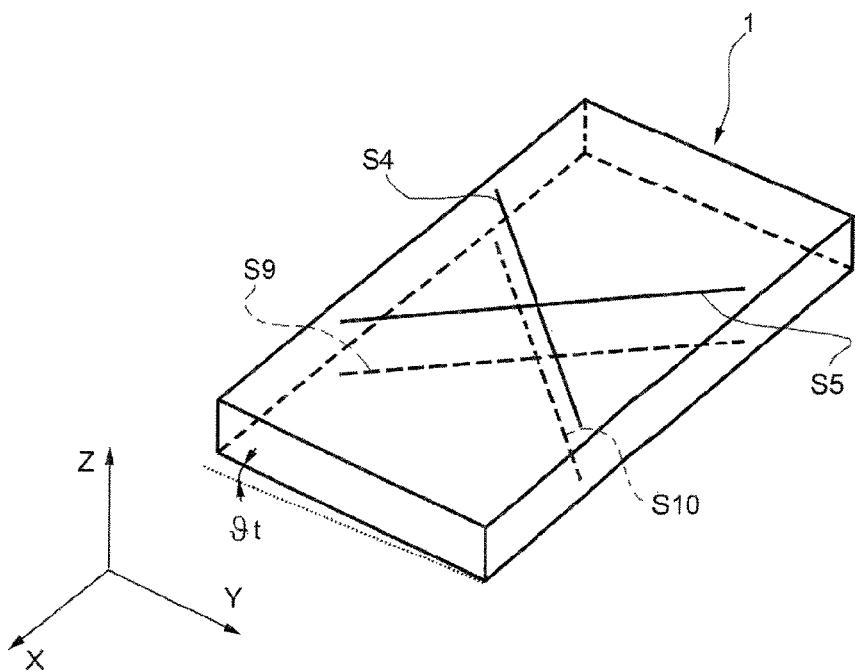

Torsion about the axis X is detected using the sensors S4, S5, S9 and S10. The angle of torsion $\theta_t$ (FIG. 7) can be calculated by applying the formula $$\theta_t=4\cdot\Delta l_4/h\sqrt{2}=-4\cdot\Delta l_5/h\sqrt{2} \quad [5]$$

or else $$\theta_t=4\cdot\Delta l_9/h\sqrt{2}=-4\cdot\Delta l_{10}/h\sqrt{2} \quad [6]$$

This measurement can be used for compensating the errors of roll in the gantry machines and the errors of angle between the two arms about the axis Y in horizontal-arm machines (it being possible to recover said errors by realignment of the triads).

Figure 8:
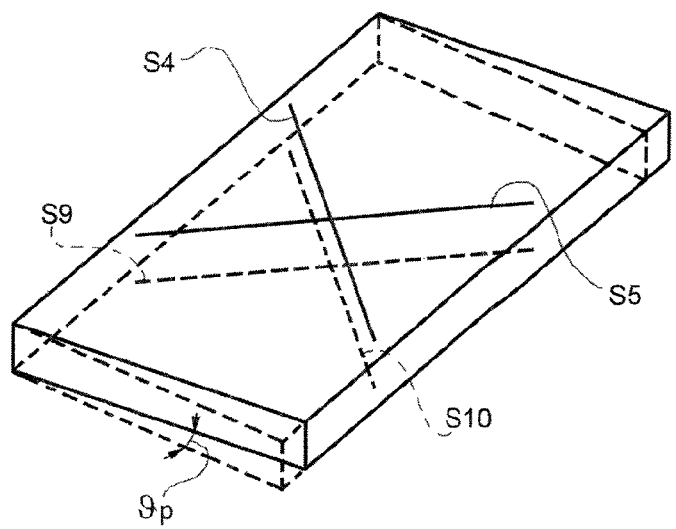

5. Differential creep skew in the plane XY is detected using once again the sensors S4, S5, S9 and S10. The angle of creep $\theta_p$ (FIG. 8) can be calculated by applying the formula $$\theta_p=4\cdot\Delta l_4/h\sqrt{2}=-4\cdot\Delta l_5/h\sqrt{2} \quad [5]$$

or else $$\theta_p=4\cdot\Delta l_9/h\sqrt{2}=-4\cdot\Delta l_{10}/h\sqrt{2} \quad [6]$$

This measurement can be used for compensating the quadrature errors between the axes X and Y in gantry machines and the errors of relative sliding between the triads along X in horizontal-arm machines (it being possible to recover said errors by realignment of the triads).

Figure 9:
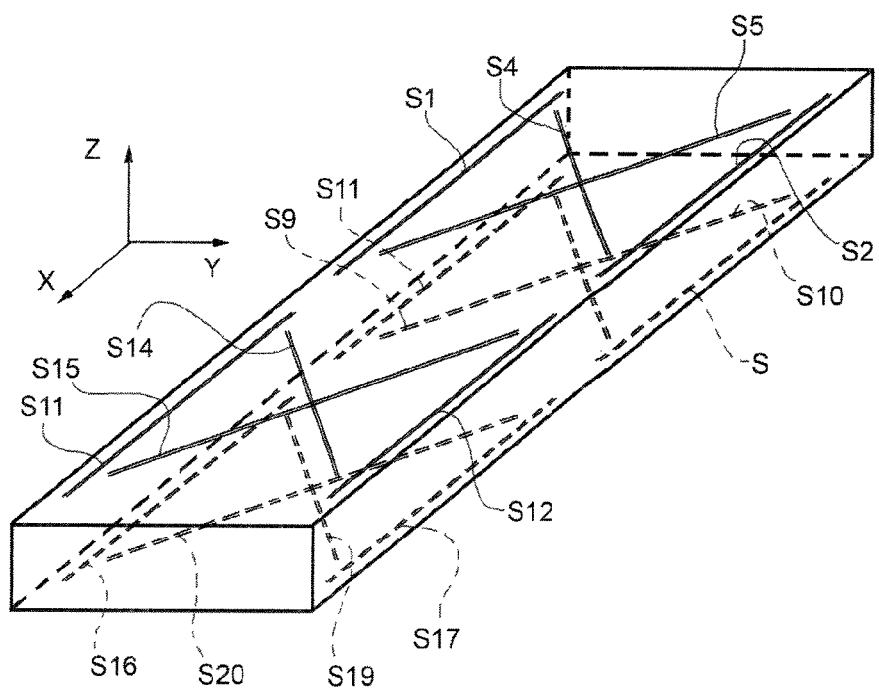
FIG. 9 illustrates a foundation block according to a variant of the present invention.

FIG. 9 illustrates a variant of the present invention, where the block 1 has a shape elongated in the direction X, as may occur for example in gantry machines.

In this case, since the assumption that the state of deformation is uniform along the axis X can depart considerably from reality, it is possible to use two (or more) sensors (S1, S11; S2, S12; S6, S16; S7, S17) aligned to one another along the axis X along each major side of the block 1, and two or more pairs of sensors set crosswise with respect to one another (S4, S5; S14, S15; SS9, S10; S19, S20) along each main face of the block.

The transverse sensor S3 can be omitted in the case where bending in the plane YZ can be considered negligible.

FIG. 9 illustrates a bridge measuring machine 21 provided with a machine bed 22 made of concrete, carrying guides 23, 24 for the main carriage 25 of the machine. The deformations of the machine bed 22 are detected via a system of sensors S1, S2, ..., S10 (not illustrated) altogether similar to what has been described previously.

On the basis of what has been described previously, it is already in part evident that the present invention provides a method for compensating the measuring errors deriving from the deformations of the block of concrete.

The method, in particular, comprises the following steps:
embedding or applying a plurality of linear measuring sensors in or on the block;
detecting, via the sensors, the state of deformation of the block (during operation, periodically or continuously); and
correcting the measuring errors deriving from the deformation of the block by means of correction data calculated on the basis of the detected state of deformation of the block.

Once the deformations have been determined, the compensation of the errors can be made with any conventional technique, for example on the basis of the same principles used for geometrical compensation of the machine.

Finally, it is clear that modifications and variations may be made to the machines described herein, without thereby departing from the sphere of protection of the present invention.

In particular, the present invention can be applied also to gantry or (single or dual) horizontal-arm machines without foundations but provided with machine beds made of concrete above the ground.

The sensors can be of a different type.

According to the application, the number and arrangement of the sensors may vary.

The invention claimed is:

1. A co-ordinate measuring machine, comprising:
a block of concrete with function of foundation or machine bed; and
a plurality of linear deformation sensors embedded in the block or applied thereto and configured for detecting the deformations of the block itself for compensating the measuring errors of the machine resulting from said deformations.

2. The machine according to claim 1, wherein said sensors are configured for detecting mean deformations along a measuring line.

3. The machine according to claim 1, wherein said sensors have an elongated shape along a line and detect variations of distance along said line.

4. The machine according to claim 1, wherein said sensors are of an optical-fibre interferometric type.

5. The machine according to claim 1, wherein the block has a parallelepipedal shape with two main faces, a top one and a bottom one, said sensors being arranged on or in the proximity of the main faces.

6. The machine according to claim 4, further comprising at least two pairs of sensors located in the proximity of respective longitudinal sides of each main face.

7. The machine according to claim 4, further comprising at least one pair of sensors arranged transversely with respect to the longitudinal sides of each main face.

8. The machine according to claim 4, further comprising at least two pairs of sensors arranged crosswise with respect to one another on each main face, and inclined each by 45° with respect to the sides of the main faces.

9. The machine according to claim 1, wherein it is of the gantry type, and in that the block of concrete constitutes a foundation thereof.

10. The machine according to claim 1, wherein it is of the horizontal-arm type, and in that the block of concrete constitutes a foundation thereof.

11. The machine according to claim 1, wherein it is of the bridge type, and in that the block of concrete constitutes a machine bed thereof provided with guides.

12. A method for compensation of the errors of a measuring machine due to deformations of a block of concrete having the function of foundation or machine bed for the machine itself, comprising the following steps:
embedding or applying a plurality of linear deformation sensors in or on the block;
detecting, via said sensors, the state of deformation of the block; and
correcting the measuring errors deriving from the deformation of the block by means of correction data calculated on the basis of the detected state of deformation of the block.

13. The method according to claim 12, wherein said step of detecting the state of deformation of the block is performed periodically during operation of the machine.

14. The method according to claim 12, wherein said step of detecting the state of deformation of the block is performed continuously during operation of the machine.

* * * * *